3,264,344
ARYLAMIDES OF BETA,BETA-DIMETHYL-ALPHA, GAMMA-DIHYDROXY BUTYRIC ACID AND THEIR ALKANOYL ESTER DERIVATIVES
André Grüssner and Otto Schnider, Basel, Switzerland, assignors to Hoffmann-La Roche Inc., Nutley, N.J., a corporation of New Jersey
No Drawing. Filed Sept. 9, 1963, Ser. No. 307,360
Claims priority, application Switzerland, Sept. 13, 1962, 10,852/62
8 Claims. (Cl. 260—490)

The present invention relates to acid amides of $\beta,\beta$-dimethyl-$\alpha,\gamma$-dihydroxybutyric acid and to processes for their preparation.

The acid amides of the invention are prepared by reacting an aromatic amine of the formula

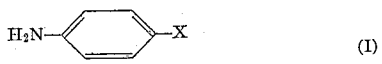
(I)

wherein X is a lower alkoxy group, a hydroxy group, or an oxygen-containing group convertible into a hydroxy group, with an acid derivative of $\beta,\beta$-dimethyl-$\alpha,\gamma$-dihydroxybutyric acid, and, if desired, where X is other than hydroxy, converting the X group into a hydroxy group.

When the symbol X in the above formula is a lower alkoxy group, this group preferably contains from 1 to 5 carbon atoms and is most preferably the ethoxy group, i.e., the starting material of the above formula is p-phenetidine.

By the use of a compound of the above formula wherein X is a lower alkoxy group, the reaction with the acid derivative of $\beta,\beta$-dimethyl-$\alpha,\gamma$-dihydroxybutyric acid results in the corresponding N-(p-lower alkoxyphenyl)-$\beta,\beta$-dimethyl-$\alpha,\gamma$-dihydroxybutyric acid amide. When p-phenetidine is employed, the product is N-(p-ethoxyphenyl)-$\beta,\beta$-dimethyl-$\alpha,\gamma$-dihydroxybutyric acid amide.

In order to obtain N-(p-hydroxyphenyl)-$\beta,\beta$-dimethyl-$\alpha,\gamma$-dihydroxybutyric acid amide, an aromatic amine of Formula I can be employed wherein X is hydroxy or an oxygen-containing group which can be converted to hydroxy after reaction with the acid derivative. Oxygen-containing groups convertible to the hydroxy group include acyloxy groups, preferably lower alkanoyloxy groups, e.g., acetoxy; benzyloxy; etc. After the reaction with the acid derivative, the oxygen-containing group can be converted to the hydroxy group through hydrolysis and the benzyloxy group can be converted to the hydroxy group through hydrogenation, whereupon the desired N-(p-hydroxyphenyl)-$\beta,\beta$-dimethyl-$\alpha,\gamma$-dihydroxybutyric acid amide is obtained.

The products of the invention accordingly have the formula

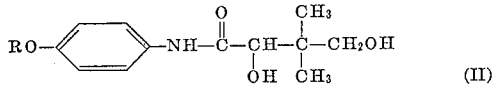
(II)

wherein R represents hydrogen or a lower alkyl group, preferably having from 1 to 5 carbon atoms, and most preferably ethyl.

The acid derivatives of $\beta,\beta$-dimethyl-$\alpha,\gamma$-dihydroxybutyric acid that can be employed in the process of the reaction include (a) $\beta,\beta$-dimethyl-$\alpha$-hydroxy-$\gamma$-butyrolactone, and (b) $\beta,\beta$-dimethyl-$\alpha,\gamma$-dihydroxybutyryl halide, e.g., the bromide or chloride, wherein the free hydroxy groups are protected by acylation, preferably alkanoylation, i.e., $\beta,\beta$-dimethyl-$\alpha,\gamma$-diacyloxybutyryl halide, preferably $\beta,\beta$-dimethyl-$\alpha,\gamma$-dialkanoyloxybutyryl halide, and most preferably $\beta,\beta$-dimethyl-$\alpha,\gamma$-diloweralkanoyloxybutyryl halide, e.g., $\beta,\beta$-dimethyl-$\alpha,\gamma$-diacetoxybutyryl chloride. Additionally, when the acid derivative is a butyryl halide, the X group in the amine of Formula I is preferably other than hydroxy to prevent competing ester formation. If a hydroxy group is desired in the final product of Formula II, X in Formula I is preferably an oxygen-containing group convertible into a hydroxy group, which conversion is carried out subsequent to the amide formation.

When $\beta,\beta$-dimethyl-$\alpha$-hydroxy-$\gamma$-butyrolactone is used as the acid derivative, the reaction with the aromatic amine of Formula I is carried out in the presence of an alkaline condensation reagent. Alkaline condensation reagents include alkali metal alcoholates such as sodium methylate, potassium ethylate, etc.; an alkali metal amide, e.g., sodamide; and alkali metals, e.g., sodium or potassium metal. It is convenient to carry out the reaction in an organic solvent, e.g., benzene, acetone, dimethylformamide, etc.

Intermediates formed by the reaction of an amide of Formula I wherein X is an oxygen-containing group with the above lactone have the formula

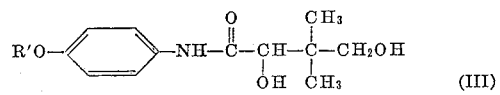
(III)

wherein R' is alkanoyl, preferably lower alkanoyl, or benzyl.

A preferred procedure consists in reacting the lactone with the aromatic amine of Formula I in dimethylformamide in the presence of sodium methylate. The reaction proceeds well while stirring even at 0°. Especially good yields of product are obtained when about 4 moles of amino compound and about 3 moles of sodium methylate are used to 1 mole of lactone. The excess of starting amino derivative can be regenerated again by working up the mother liquor.

When a $\beta,\beta$-dimethyl-$\alpha,\gamma$-diacyloxybutyryl halide is reacted with an amino derivative of Formula I, the reaction is advantageously carried out in an organic solvent, e.g., benzene, acetone, or, preferably, in dimethylformamide. The addition of an organic or inorganic acid-binding agent, e.g., pyridine, potassium carbonate, etc., is advised, but not essential. In the absence of such acid-binding agent an excess of the amine of Formula I must, however, be used. Accordingly, an acid-binding agent is employed in the reaction wherein the acid-binding agent can be an excess of the starting amine of Formula I, or another organic or inorganic acid-binding agent. The reaction, which proceeds exothermically, is conveniently carried out at elevated temperature, e.g., at a temperature in the range of about 20° to about 140° C.

The intermediates formed by reaction of an amine of Formula I with a $\beta,\beta$-dimethyl-$\alpha,\gamma$-dicycloxybutyryl halide have the formula

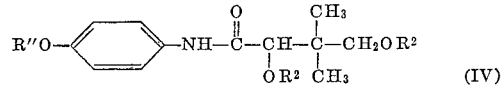
(IV)

wherein R" is hydrogen, lower alkyl, alkanoyl, preferably lower alkanoyl, or benzyl, and R² is alkanoyl, preferably lower alkanoyl.

In the intermediate reaction product of Formula IV, the -$\alpha,\gamma$-alkanoyl protecting groups which are present are subsequently split off by hydrolysis, e.g., by treatment with aqueous caustic soda. When R" is also an alkanoyl group, this hydrolysis reaction removes this alkanoyl group as well. When R" is benzyl, the benzyl group is removed by hydrogenation, as described above.

In general terms then, the process of the reaction is carried out by reacting an aromatic amine of the formula

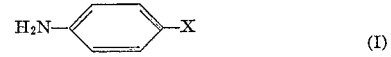
(I)

wherein X has the meaning given above, with either (a) $\beta,\beta$-dimethyl-$\alpha$-hydroxy-$\gamma$-butyrolactone, or (b) $\beta,\beta$-dimethyl-α,γ-dialkanoyloxybutyryl halide to form a compound of the formula

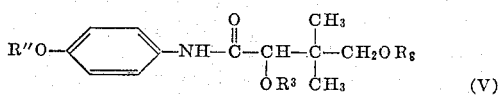

wherein R'' has the meaning given above for the compound of Formula IV, and $R^3$ is either alkanoyl, preferably lower alkanoyl, or hydrogen, and where R'' is other than hydrogen or lower alkyl, and/or $R^3$ is other than hydrogen, converting the compound into a compound of Formula II above.

The products of the invention possess valuable peripheral analgesic activity without undesirable side effects. Accordingly, the instant compounds are useful as analgesic agents.

The active material can be admixed with customary excipients for pharmaceutical dispensing forms (such as, for example, maize starch, talc or mixtures thereof) and, if desired, also with other known active materials (e.g. with 1-phenyl-2,3-dimethyl-4-isopropyl-5-pyrazolone, caffeine, codeine, salicylic acid and derivatives thereof, etc.). The preparations obtained by admixture with excipients can be converted by known methods into pharmaceutical dispensing forms such as, for example, suspensions, tablets, pills, suppositories, and the like.

*Example 1*

1000 g. of p-phenetidine are dissolved in 600 ml. of dimethylformamide and treated portionwise with 340 g. of sodium methylate. To this is added dropwise, during 8 hours while cooling with ice, a solution of 260 g. of D,L-α-hydroxy-β,β-dimethyl-γ-butyrolactone in 600 ml. of dimethylformamide in such a way that the temperature does not rise above +2°. Subsequently, it is stirred for a further 20 hours while cooling with ice. Thereafter, the viscous content of the flask is treated with 4–5 kg. of finely crushed ice while stirring well. After this, 3 N hydrochloric acid is added slowly thereto while stirring well until Congo paper just becomes blue. After seeding, the solution is again stirred for several more hours at 0° for completion of crystallization. The crystal mass is filtered off under suction, washed with ice water and ether and dried. 358 g. of N-(p-ethoxyphenyl)-β,β-dimethyl-α,γ-dihydroxybutyric acid amide of melting point 103–104° (corr.) are obtained. By extraction of the filtrate separated above with chloroform, concentration of the chloroform solution and recrystallization of the residue from isopropyl acetate an additional 48 g. of the amide of melting point 103–104° are obtained. After recrystallization of the crude product from isopropyl acetate, 379 g. of a pure product of melting point 105° (corr.) are obtained.

The excess of p-phenetidine used can be recovered by making the acid-aqueous filtrate obtained above, after extraction thereof with methylene chloride, alkaline by the addition of caustic soda, whereby the separated p-phenetidine is isolated by extraction with benzene.

*Example 2*

310 g. of D,L-β,β-dimethyl-α,γ-diacetoxybutyric acid chloride (Journ. Am. Chem. Soc., 1940, 62, 2251-2) are added dropwise to a solution of 170 g. of p-phenetidine in 900 ml. of dimethylformamide to which 170 g. of anhydrous potassium carbonate had been added, whereby the temperature rises up to 80°. The reaction mixture is stirred at this temperature for yet a further 2 hours, then cooled down and poured on to ice. After the addition of ether and separation of the ethereal layer, the ether layer is successively washed with water, dilute hydrochloric acid and once more with water. After drying and concentration of the ethereal phase, 397 g. of N-(p-ethoxyphenyl)-β,β-dimethyl-α,γ-diacetoxybutyric acid amide are obtained. This amide is stirred overnight at room temperature in a solution of 91 g. of sodium hydroxide in 1200 ml. of water. Thereafter, it is filtered off under suction and the residue washed until neutral with ice cold water. The dried product melts at 105° after recrystallization from isopropyl acetate and represents pure N-(p-ethoxyphenyl)-β,β-dimethyl-α,γ-dihydroxybutyric acid amide.

*Example 3*

170 g. of sodium methylate are added portionwise to 800 ml. of dimethylformamide. To the resulting solution a solution of 130 g. of D,L-α-hydroxy-β,β-dimethyl-γ-butyrolactone and 278 g. of p-benzyloxyaniline (M.P. 52–55° C.) in 400 ml. of dimethylformamide is dropped in during 8 hours while cooling with ice so that the temperature does not rise above 2° C. Thereafter the mixture is stirred for another 20 hours while being cooled with ice. Then the viscous flask contents are treated under good stirring with 2–5 kg. of finely divided ice. Thereafter 3 N hydrochloric acid is added slowly with good stirring until the solution is blue to Congo paper. The solution is extracted with methylene chloride, the methylene chloride solution washed with dilute hydrochloric acid and water, dried over anhydrous sodium sulfate, and evaporated to dryness. The residue crystallizes by triturating with water. The crystallized residue melts at 107–110° C. The crude product is recrystallized from butyloxide to yield 275 g. of pure N-(p-benzyloxyphenyl)-β,β-dimethyl-α,γ-dihydroxybutyric acid amide of melting point 110–111° C.

80 g. of p-benzyloxyaniline is recovered from the acid-aqueous solution by treatment with sodium hydroxide solution until alkaline, followed by extraction with methylene chloride.

113 g. of the above obtained N-(p-benzyloxyphenyl)-β,β-dimethyl-α,γ-dihydroxybutyric acid amide is dissolved in 1000 ml. of methanol, and hydrogenated after the addition of 12 g. of palladium-on-charcoal (5 percent palladium). The theoretical quantity of hydrogen is taken up in 8 hours. After filtration and evaporation of the solvent, the residue is crystallized from 200 ml. of acetonitrile to yield 70 g. of N-(p-hydroxyphenyl)-β,β-dimethyl-α,γ-dihydroxybutyric acid amide of melting point 175–176° C.

We claim:

1. A compound of the formula

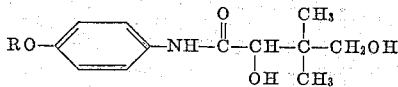

wherein R is selected from the group consisting of hydrogen and lower alkyl.

2. N-(p-ethoxyphenyl)-β,β-dimethyl-α,γ-dihydroxybutyric acid amide.

3. N-(p-hydroxyphenyl)-β,β-dimethyl-α,γ-dihydroxybutyric acid amide.

4. A compound of the formula

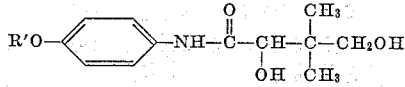

wherein R' is selected from the group consisting of alkanoyl and benzyl.

5. N-(p-benzyloxyphenyl)-β,β-dimethyl-α,γ-dihydroxybutyric acid amide.

6. A compound of the formula

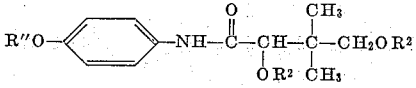

wherein R'' is selected from the group consisting of hydrogen, lower alkyl, alkanoyl, and benzyl, and $R^2$ is an alkanoyl group.

7. N-(p-ethoxyphenyl)-β,β-dimethyl-α,γ-dialkanoyloxybutyric acid amide.

8. N-(p-ethoxyphenyl)-β,β-dimethyl-α,γ-diacetoxybutyric acid amide.

(References on following page)

References Cited by the Examiner

UNITED STATES PATENTS

| | | |
|---|---|---|
| 1,901,565 | 3/1933 | Pasternack. |
| 2,830,087 | 4/1958 | Ehrhart. |
| 3,078,300 | 2/1963 | Villax _____ 260—534 X |

FOREIGN PATENTS 277,022  7/1914  Germany.

OTHER REFERENCES

Merck Index, 6th Ed., p. 717 (1952).
Migrdichian, Organic Synthesis, vol. 1, 1957, pp. 336–338.
Royals, Advanced Organic Chemistry, 1954, p. 617.

LORRAINE A. WEINBERGER, *Primary Examiner.*
LEON ZITVER, *Examiner.*
D. P. CLARKE, V. GARNER, *Assistant Examiners.*